United States Patent
Takahashi et al.

(10) Patent No.: US 6,813,763 B1
(45) Date of Patent: Nov. 2, 2004

(54) PROGRAM CONVERSION DEVICE FOR INCREASING HIT RATE OF BRANCH PREDICTION AND METHOD THEREFOR

(75) Inventors: Satoshi Takahashi, Kawasaki (JP); Hajime Okuda, Nagoya (JP); Kazutaka Aizawa, Matsumoto (JP)

(73) Assignee: Fujitsu Limited, Kawasaki (JP)

( * ) Notice: Subject to any disclaimer, the term of this patent is extended or adjusted under 35 U.S.C. 154(b) by 655 days.

(21) Appl. No.: 09/716,943

(22) Filed: Nov. 22, 2000

(30) Foreign Application Priority Data

Mar. 24, 2000 (JP) ........................................ 2000-084513

(51) Int. Cl.$^7$ ................................................ G06F 9/45
(52) U.S. Cl. ...................... 717/151; 717/127; 717/130; 717/131; 717/140; 717/139; 717/159; 712/206; 712/227; 712/239; 712/233; 712/238
(58) Field of Search ................................. 717/127, 130, 717/131, 132, 133, 136, 139, 140, 141, 151, 158, 159, 128, 129; 712/206, 227, 239, 233, 238, 207, 240, 237

(56) References Cited

U.S. PATENT DOCUMENTS

| | | | |
|---|---|---|---|
| 5,050,068 A * | 9/1991 | Dollas et al. ................ | 712/206 |
| 5,226,130 A * | 7/1993 | Favor et al. ................. | 712/238 |
| 5,295,248 A * | 3/1994 | Miyamori .................... | 712/239 |
| 5,428,786 A * | 6/1995 | Sites ............................ | 717/151 |
| 5,434,985 A * | 7/1995 | Emma et al. ................ | 712/240 |
| 5,485,587 A * | 1/1996 | Matsuo et al. .............. | 712/234 |
| 5,737,590 A * | 4/1998 | Hara ........................... | 712/238 |
| 5,875,324 A * | 2/1999 | Tran et al. ................... | 712/238 |
| 5,995,749 A * | 11/1999 | Tran ............................ | 712/239 |
| 6,178,492 B1 * | 1/2001 | Matsuo ........................ | 712/23 |
| 6,351,844 B1 * | 2/2002 | Bala ............................ | 717/128 |
| 6,397,379 B1 * | 5/2002 | Yates, Jr. et al. ........... | 717/140 |
| 6,477,639 B1 * | 11/2002 | Krishnan et al. ........... | 712/237 |
| 6,560,693 B1 * | 5/2003 | Puzak et al. ................. | 712/207 |
| 6,591,414 B2 * | 7/2003 | Hibi et al. ................... | 717/151 |
| 6,647,491 B2 * | 11/2003 | Hsu et al. .................... | 712/237 |
| 6,651,163 B1 * | 11/2003 | Kranich et al. ............. | 712/244 |

FOREIGN PATENT DOCUMENTS

| EP | 0 836 755 A2 | 4/1998 |
|---|---|---|
| JP | 10-187460 | 7/1998 |

OTHER PUBLICATIONS

Title: Two–Level Adaptive Training Branch Prediction, author: Yeh et al, ACM, 1991.*
Title: Accurate Static Branch Prediction by Value Range Propagation, author: Patterson, ACM, 1995.*
Title: Predicting Indirect Branches via Data Compression, author: Kalamatianos et al, IEEE, 1998.*
Title: Speculative Execution and Branch Prediction on Parallel Machines, author: Theobald et al, ACM, 1993.*

* cited by examiner

*Primary Examiner*—Ohameli C. Das
(74) *Attorney, Agent, or Firm*—Staas & Halsey LLP

(57) ABSTRACT

The branch prediction characteristics of a computer for executing a program are recognized, a binary program matched to the characteristics is constituted. A program conversion device converting a first binary program constituted by a plurality of instruction blocks into a second binary program executed by a computer having a branch prediction unit includes an execution information storage storing execution information collected when the first binary program is executed in advance, an analyzer analyzing execution characteristics of a branch instruction between the plurality of instruction blocks in the first branch program from the execution information, a branch prediction characteristics storage storing branch prediction characteristics of the computer, and a converter updating a branch instruction between the plurality of instruction blocks in the first binary program on the basis of the execution characteristics of the branch instruction and the branch prediction characteristics such that a bit rate of the branch prediction is increased.

12 Claims, 14 Drawing Sheets

FIG.4

| MACHINE CYCLE | 1 | 2 | 3 | 4 | 5 | 6 | 7 | 8 | 9 |
|---|---|---|---|---|---|---|---|---|---|
| INSTRUCTION 1 | IF | D | OF | EX | S | | | | |
| INSTRUCTION 2 | | IF | D | OF | EX | S | | | |
| INSTRUCTION 3 | | | EX | IF | D | OF | S | | |
| INSTRUCTION 4 | | | | IF | D | OF | EX | S | |
| INSTRUCTION 5 | | | | | IF | D | OF | EX | S |

FIG.5

| ADDRESS | INSTRUCTION CODE | | |
|---|---|---|---|
| F0001000 | ENT1: | CALL | _funck2 |
| F0001004 | | TEST | eax, ebx |
| F0001008 | | JNE | L1 |
| F000100C | | PUSH | OFFSET FLAT:$SG2 |
| F0001010 | | CALL | _printf |
| F0001014 | | ADD | esp, 4 |
| F0001018 | | PUSH | 1 |
| F000101C | | CALL | _exit |
| F0001020 | | ADD | esp, 4 |
| F0001024 | L1: | RET | 0 |

- 20 (rows F0001000–F0001008)
- 21 (rows F000100C–F0001020)
- 22 (row F0001024)

FIG.6

| ADDRESS | INSTRUCTION CODE | | |
|---|---|---|---|
| F0001000 | ENT1: | CALL | _funck2 |
| F0001004 | | TEST | eax, ebx |
| F0001008 | | JE | new_L1 |
| F000100C | L1: | RET | 0 |
| F0001010 | new_L1:PUSH | OFFSET | FLAT:$SG2 |
| F0001014 | | CALL | _printf |
| F0001018 | | ADD | esp, 4 |
| F000101C | | PUSH | 1 |
| F0001020 | | CALL | _exit |
| F0001024 | | ADD | esp, 4 |
| F0001028 | | JMP | L1 |

20
22
21

PROGRAM CONVERSION DEVICE FOR INCREASING HIT RATE OF BRANCH PREDICTION AND METHOD THEREFOR

BACKGROUND OF THE INVENTION

Field of the Invention

The present invention relates to a binary program conversion device and method for converting a binary program into another binary program and, more particularly, to a technique in which an instruction string in an unconverted binary program is updated into another instruction string to increase the execution speed of execution of a converted program.

As an invention related to conversion of a binary program of this type, an invention filed by the present applicant and disclosed in Japanese Patent Application Laid-Open No. 10-187460 or the like is known. In this prior art, when a converted binary program is executed by a computer having a cache memory, a device and a method for reconstituting a plurality of instruction blocks of an unconverted binary program are proposed to increase a hit rate of the cache memory.

In this invention, an unconverted binary program constituted by a plurality of instruction blocks is temporarily executed first. On the basis of information obtained when the program is executed, an executed instruction block is separated from an unexecuted program, and a plurality of instruction blocks are reconstituted such that executed programs continue. In this manner, a part which is actually executed in the converted program is localized to achieve effective usage of the cache memory. As a result, the hit rate of the cache memory is increased.

On the other hand, as a technique for increasing the speed of a computer, in addition to the usage of the cache memory, the following pipeline process is known. That is, the execution of one instruction is finely divided into a plurality of stages, and the stages are executed like an assembly-line operation, or a series of instructions which are continuously executed like an assembly-line operation. In this pipeline process, it is very important for increasing the speed of a computer that the order of processes of the assembly-line operation is prevented from being disturbed. In such a pipeline process, the flow of instructions is interrupted by a conditional branch instruction, so that the assembly-line operation may be disturbed. In this case, it is a problem that excessive time is spent to compose the flow of the pipeline again after the conditional branch instruction is executed. In order to prevent the pipeline from being disturbed, a function called a branch prediction is built in a recent computer. A branched instruction which is predicted in advance is preferentially filled in the pipeline, so as to reduce the disturbance.

As the branch prediction, two types of branch predictions, i.e., static branch prediction and dynamic branch prediction are known. The dynamic branch prediction is performed on the basis of the history of past branch directions. More specifically, the execution efficiency of a pipeline is improved by a prediction function included in a computer for executing an instruction depending on the instruction execution state.

On the other hand, in the static branch prediction, the direction of branch to be predicted (upper direction or lower direction of address) is predetermined in an execution program. The static branch prediction is used for predicting a branch destination in an initial state in which a history of branches has not been formed or a state in which a branch prediction buffer (memory) for storing a history of branches is overflowed not to use the branch history of the instruction.

As the static branch prediction, various static predictions performed by the CPU of a computer are known. For example, a branch prediction bit is included in a branch instruction, and the branch prediction bit can be set when a program is compiled, or the characteristics of the branch prediction are implicitly determined in advance. When the characteristics of the branch prediction are implicitly determined, if a binary program is not constituted such that the characteristics are utilized, not only the characteristics are not effectively used, but also execution performance may be degraded.

In the conventional technique described above, the processing rate of a computer is increased by increasing a hit rate of a cache memory. However, it is not considered that the hit rate is increased in consideration of the characteristics of the static branch prediction. Therefore, disturbance of a pipeline is not always effectively reduced by the static branch prediction.

SUMMARY OF THE INVENTION

The present invention has been made in consideration of the above problems of the conventional technique. More specifically, it is an object of the present invention to recognize the branch prediction characteristics of a computer for executing a program, to constitute a binary program corresponding to the characteristics to increase a hit rate of the prediction, to effectively prevent disturbance of a pipeline, and to increase the processing rate.

In order to solve the problem, the present invention employs the following means. In short, the present invention executes an unconverted program in advance, analyzes the execution characteristics of a branch instruction from the execution information, recognizes the characteristics of a static branch prediction of a computer, and constitutes a binary program such that the direction of the branch prediction coincides with the direction of an actual branch. In this manner, the present invention increases the hit rate of a branch prediction in execution of an instruction.

More specifically, the present invention is a program conversion device for converting a first binary program constituted by a plurality of instruction blocks into a second binary program executed by a computer having branch prediction means, including:

execution information storage storing execution information collected when the first binary program is executed in advance;

analyzer analyzing execution characteristics of a branch instruction between the plurality of instruction blocks in the first branch program from the execution information;

branch prediction characteristics storage storing branch prediction characteristics of the computer; and converter updating a branch instruction between the plurality of instruction blocks in the first binary program on the basis of the execution characteristics of the branch instruction and the branch prediction characteristics such that a hit rate of the branch prediction is increased.

As the converter, the following process is preferably used. That is, when the computer has branch prediction characteristics for performing a rather low prediction of the execution probability of a branch with respect to a branch instruction to an address in an upper direction, a plurality of instruction blocks are reconstituted such that a branch instruction having a low frequency in the occurrence of a branch becomes a branch instruction to an address in the upper direction and that a branch instruction having a high frequency in the occurrence of a branch becomes a branch instruction to an address in a lower direction.

In this manner, a prediction that a branch is not performed to a branch instruction having a low frequency in the occurrence of an actual branch is hit. Then a pipeline is prevented from being disturbed, and the execution speed of a computer can be increased.

The converter may reconstitute, with respect to a branch instruction having a high frequency in the occurrence of a branch, a plurality of instruction blocks such that a portion corresponding to an instruction block before branch and a portion corresponding to an instruction block after branch continue.

The reconstitution of the plurality of instruction blocks of the binary program before branch performed such that the instruction block before branch and the instruction block after branch continue is to arrange a program as following.

More specifically, an unconverted binary program is arranged such that a plurality of instruction blocks which are connected by a branch instruction having a high frequency in the occurrence of a branch are linearly executed without any branch. The program is also arranged such that an instruction block which is not frequently executed is executed as a branch destination of a branch instruction.

In this manner, when instruction blocks which are probably continuously executed are continuously arranged, a pipeline is prevented from being disturbed, and the execution speed of the computer is increased.

In addition, as the converter, the following process is also preferably used. That is, when the computer has branch prediction characteristics for performing a rather low prediction of the execution probability of a branch with respect to a branch instruction to an address in a lower direction, a plurality of instruction blocks are reconstituted such that a branch instruction having a low frequency in the occurrence of a branch becomes a branch instruction to an address in the lower direction and that a branch instruction having a high frequency in the occurrence of a branch becomes a branch instruction to an address in an upper direction.

In this manner, a prediction that a branch is not performed to a branch instruction having a low frequency in the occurrence of an actual branch is hit. Then a pipeline is prevented from being disturbed, and the execution speed of a computer can be increased.

Furthermore, the binary program conversion device may reconstitute, with respect to a branch instruction having a high frequency in the occurrence of a branch, a plurality of instruction blocks such that a portion corresponding to an instruction block before branch and a portion corresponding to an instruction block after branch continue.

In this manner, when instruction blocks which are probably continuously executed are continuously arranged, a pipeline is prevented from being disturbed, and the execution speed of the computer is increased.

The present invention is also a method of converting a first binary program constituted by a plurality of instruction blocks into a second binary program executed by a computer having branch prediction means, including:

reading execution information collected when the first binary program is executed in advance;

analyzing execution characteristics of a branch instruction between the plurality of instruction blocks of the first program from the execution information;

referring to branch prediction characteristics of the computer; and updating branch instructions between the plurality of instruction blocks in the first binary program on the basis of the execution characteristics of the branch instruction and the branch prediction characteristics such that a hit rate of the branch prediction is increased and outputting the second binary program.

The present invention is also a program for causing a computer to convert a first binary program constituted by a plurality of instruction blocks into a second binary block executed by a computer having branch prediction means, wherein a program which sequentially performs:

the step of reading execution information collected when the first binary program is executed in advance;

the step of analyzing execution characteristics of a branch instruction between the plurality of instruction blocks of the first program from the execution information;

the step of referring to branch prediction characteristics of the computer; and the step of updating a branch instruction between the plurality of instruction blocks in the first binary program on the basis of the execution characteristics of the branch instruction and the branch prediction characteristics such that a hit rate of the branch prediction is increased and outputting the second binary program. The program may be recorded on a computer readable recording medium, and the computer readable recording medium may be distributed.

As described above, according to the present invention, the plurality of instruction blocks of the binary program are reconstituted such that the hit rate of a branch prediction is increased. For this reason, a pipeline is prevented from be disturbed, and the performance of a computer having a pipeline process function can be sufficiently achieved.

In addition, according to the present invention, when the computer has characteristics for performing a rather low prediction of the execution probability of a branch with respect to a branch instruction to an address in an upper direction, instruction blocks are reconstituted such that a branch instruction having a low execution frequency in the occurrence of a branch becomes a branch instruction to an address in the upper direction and that a branch instruction having a high execution frequency in the occurrence of a branch becomes a branch instruction to an address in a lower direction, and a pipeline is reduced in disturbance.

Furthermore, according to the present invention, instruction blocks are reconstituted such that a plurality of instruction blocks before and after a branch caused by a branch instruction having a high execution frequency in the occurrence of a branch continue. For this reason, an increase in a hit rate of a cache memory and an increase in a hit rate of a branch prediction can be achieved.

When the computer has characteristics for performing a rather low prediction of the execution probability of a branch with respect to a branch instruction to an address in a lower direction, a plurality of instruction blocks are reconstituted such that a branch instruction having a low execution Frequency in the occurrence of a branch becomes a branch instruction to an address in the lower direction and that a branch instruction having a high execution frequency in the occurrence of a branch becomes a branch instruction to an address in an upper direction. As a result, a pipeline is reduced in disturbance.

BRIEF DESCRIPTION OF THE DRAWINGS

FIG. 4 is a diagram showing executions of instructions performed by a pipeline process.

FIG. 5 is a diagram showing unconverted program 1.

FIG. 6 is a diagram showing converted program 1.

DETAILED DESCRIPTION OF THE PREFERRED EMBODIMENTS

Embodiments of the present invention will be described below with reference to the drawings of FIGS. 1 to 14. A binary program conversion technique for increasing a hit rate of a cache memory is disclosed in Japanese Patent Application Laid-Open No. 10-187460 or the like described above. For this reason, in the embodiments, in particular, embodiments for increasing a hit rate of a branch prediction when a branch instruction is executed will be described in detail.

Figure 3:
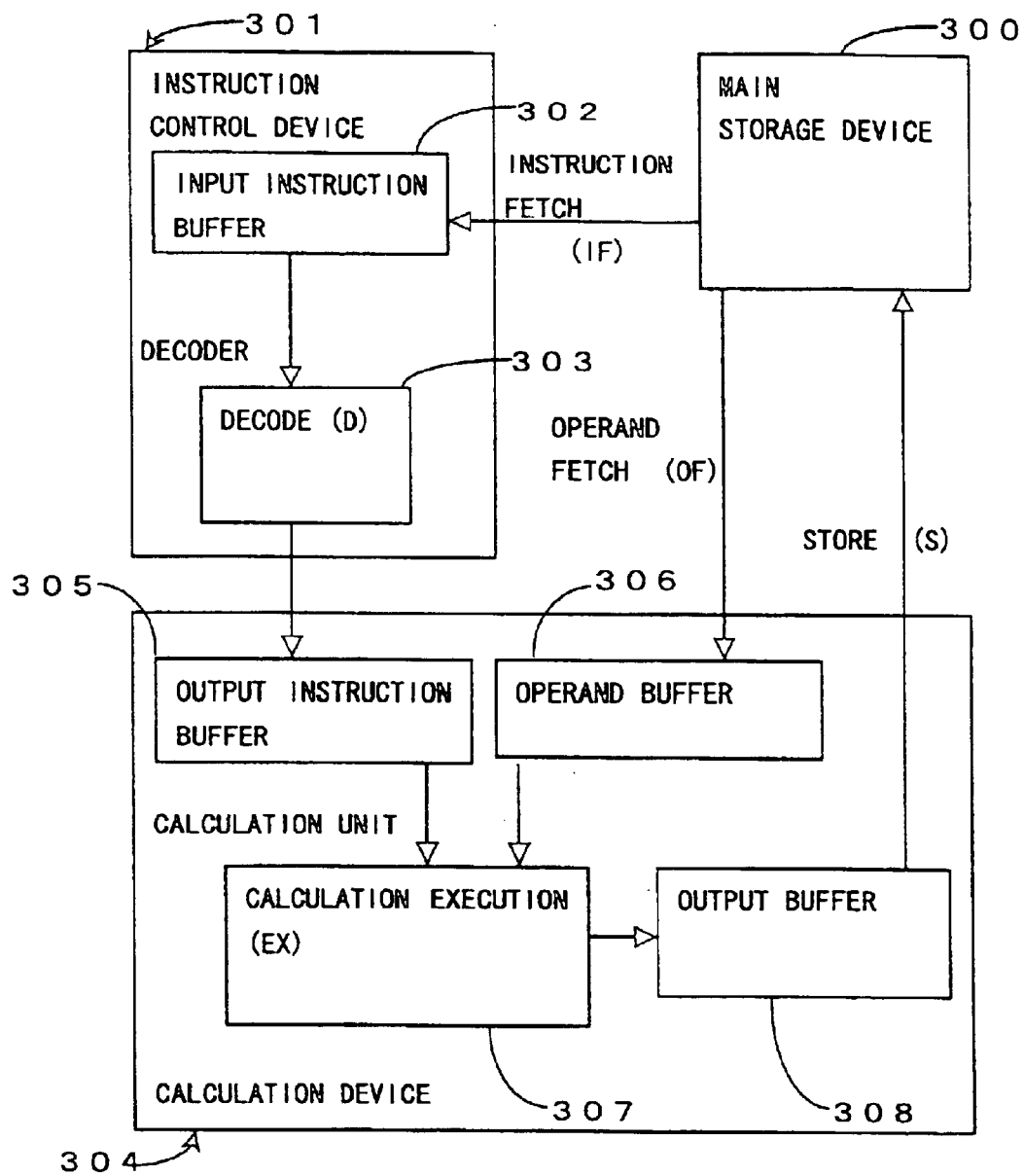
FIG. 3 is a block diagram showing an example of a configuration of a computer.

A pipeline process function of a general computer will be described with reference to FIGS. 3 and 4 first. The pipeline process is to execute instructions in the CPU of a computer like an assembly-line operation, and is a technique for simultaneously operating constituent elements of the CPU of the computer.

The instructions of the CPU of the computer are executed through stages, i.e. fetch (instruction fetch called IF) of an instruction from a main storage unit, decode of an instruction (decode called D), fetch (operand fetch called OF) of data serving as an object of an instruction from the main storage unit, calculation execution (called EX), and storage (store called S) of a calculation result into the main memory. FIG. 3 shows a configuration example of a computer for executing these stages.

In a computer having no pipeline process function, after these stages (IF to S) are completed for one instruction, the next instruction is fetched, and the processes are sequentially executed. Since one machine cycle is spent in each stage, in this case, one instruction is executed by 5 machine cycles, i.e., IF, D, OF, EX, and S.

On the other hand, when this instruction is executed by a computer having a pipeline process function, as shown in FIG. 4, fetch of instruction 1 is completed in the first machine cycle, and instruction 1 is decoded in the second machine cycle. At this time, instruction 2 which is the next instruction is fetched. The subsequent instructions are fetched like an assembly-line operation. In the machine cycles subsequent to the fifth machine cycle, the execution result of one instruction is stored every one machine cycle.

In this manner, in the computer having the pipeline process function, after instructions are filled in the respective stages of a pipeline (in FIG. 4, at the fifth machine cycle corresponds to this state), at the magnifying power (5 in the example in FIG. 4) of the number of stages (five stages in the example in FIG. 4) constituting the pipeline, the instruction is executed at a speed higher than that in a CPU which has no pipeline process function.

However, when the execution order of instructions is arbitrarily changed by a conditional branch instruction in the middle of a pipeline process in a computer having such a function, instructions filled in the pipeline immediately before a branch are not necessary, and the instructions are filled in the pipeline from the instruction of a branch destination again. For this reason, the execution result of the instruction cannot be obtained until the state of the fifth machine cycle in FIG. 4 is set. As a result, the performance cannot be sufficiently achieved.

In order to prevent a pipeline from being disturbed by the conditional branch instruction, a branch prediction function is added to a recent computer. More specifically, when a branch destination is known, the process can be executed without interrupting the flow of the pipeline by filling the instruction of the branch destination in the pipeline. For this reason, the execution result of one instruction can be smoothly obtained in one machine cycle before and after the branch. As such a branch prediction function, two types of branch predictions, i.e., a dynamic branch prediction and a static branch prediction are known.

The dynamic branch prediction is a function which stores a branch history according to the execution results of the program obtained up to this and predicts the directions of subsequent branches on the basis of the history. In the dynamic branch prediction, a prediction of a branch destination also changes depending on a state with respect to the same branch instruction in one program. On the other hand, the static branch prediction is a technique which determines a branch destination in advance with respect to a branch instruction which has never been executed and is not included in the execution history or a branch instruction whose execution history is not stored because a memory for storing the branch history overflows.

In this case, a method for giving a prediction bit representing whether a branch is performed or not to a branch instruction to indicate a branch prediction direction on a stage for compiling a program and a method of implicitly determining a branch direction are known.

For example, a Pentium Pro processor available from Intel corporation (The processor is to be referred to as a Pentium Pro hereinafter. Pentium Pro is a trademark of Intel corporation.) uses the later method. In the Pentium Pro, of conditional branch instructions have no branch history, a branch instruction in which a branch destination address has an upper direction is predicted not to be branched, and a branch instruction in which a branch destination address has a low direction is predicted to be branched.

Here, the upper address direction means a direction in which the address increases on the main memory device, i.e., an upper direction of a program counter representing the next execution instruction position. The lower direction of an address means a direction in which the address decreases on the main storage device.

When branch instructions are given to a processor having characteristics similar to those of Pentium Pro at random, an actual branch direction does not coincide with a branch direction which is predicted by a processor, the waste described above may be generated in the pipeline.

In this embodiment, a technique for efficiently executing a pipeline process by a hit rate of the branch prediction of a processor having such a static branch prediction function in the processor will be described below. This technique is realized in a function which converts a binary program to obtain another binary program.

In the following embodiment, like the Pentium Pro described above, it is assumed that the processor predicts that a branch is not performed for a branch instruction whose branch direction is the upper address direction and, on the other hand, that a branch is performed for a branch instruction whose branch direction is the lower direction of an address.

Figure 1:
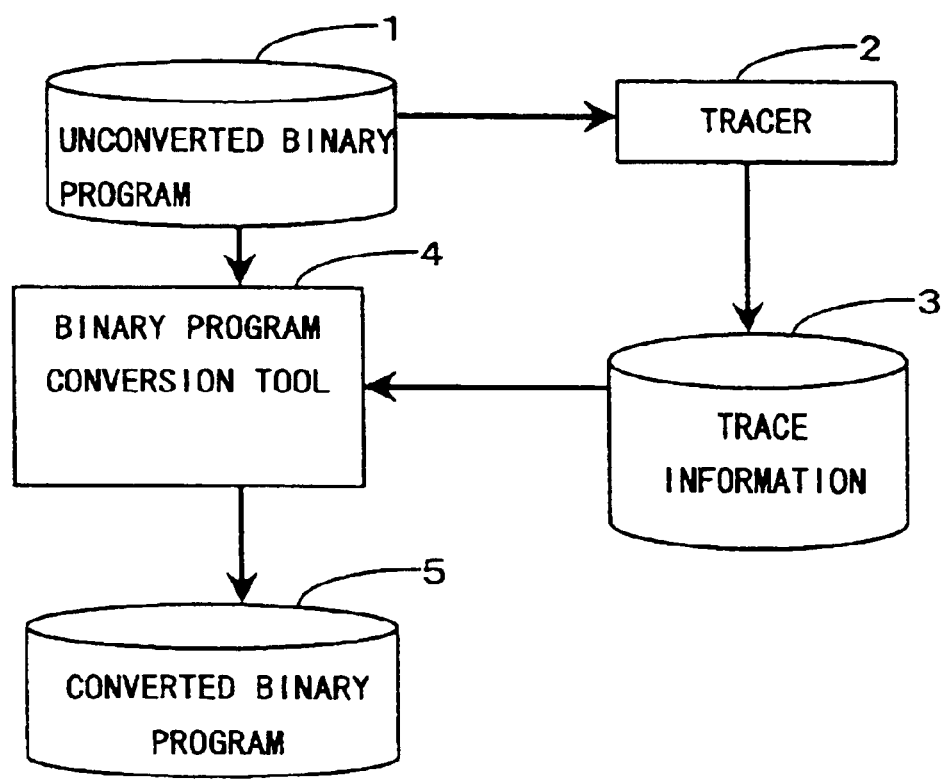
FIG. 1 is a block diagram showing the input/output relationship of a binary program conversion tool according to a first embodiment of the present invention.

FIG. 1 is a block diagram showing the input/output relationship of a binary program conversion tool 4 according to the first embodiment of the present invention. As shown in FIG. 1, in this embodiment, tracer 2 is used together with the binary program conversion tool 4. The binary program conversion tool 4 receives trace information 3 generated by the tracer 2 and it generates a converted binary program 5 from an unconverted binary program 1.

Figure 2:
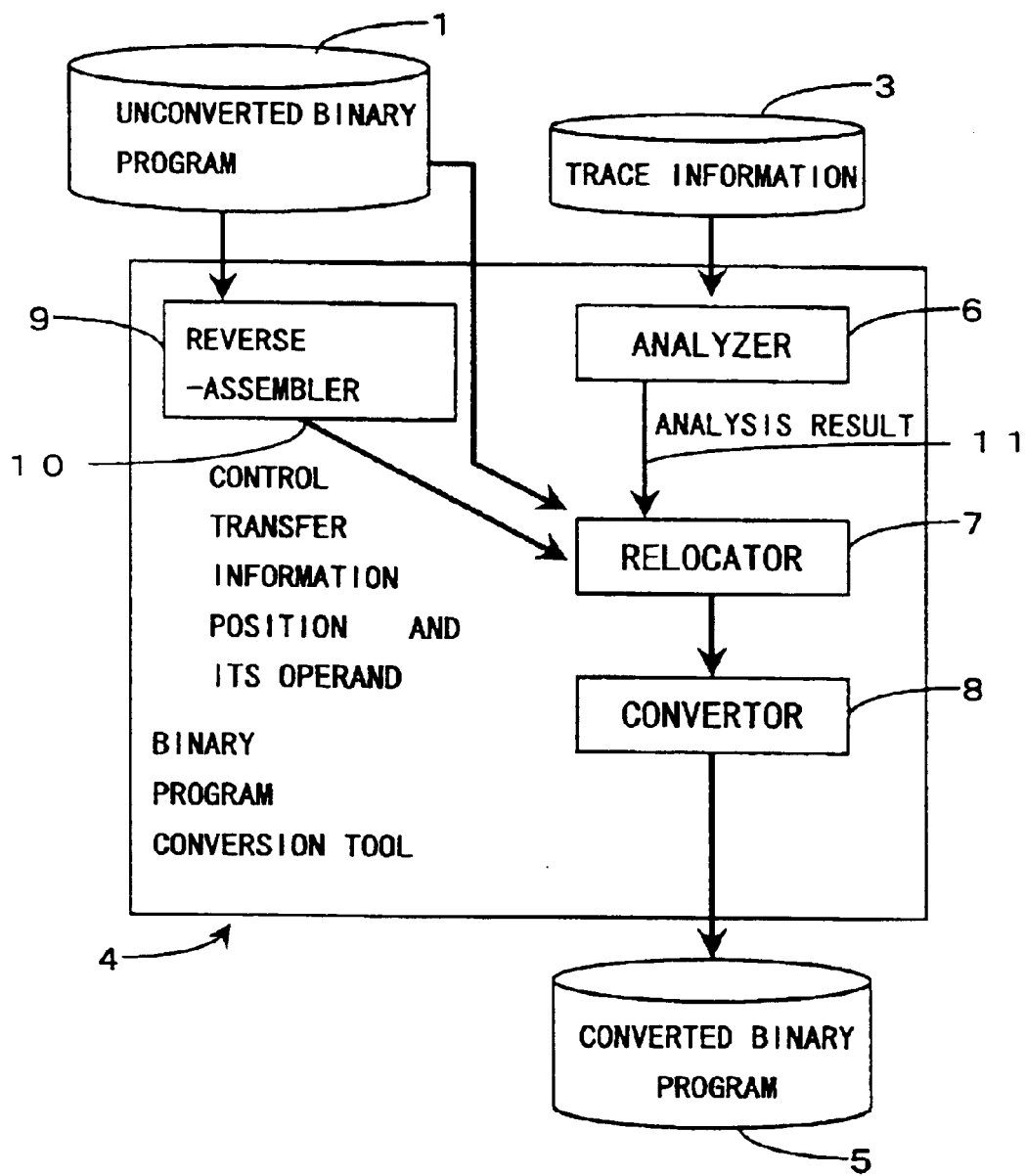
FIG. 2 is a block diagram showing the configuration of a binary program conversion tool according to the first embodiment of the present invention.

FIG. 2 is a block diagram showing the configuration of the binary program conversion tool 4. As shown in FIG. 2, the binary program conversion tool 4 is constituted by an analyzer 6 for analyzing the trace information 3, a relocator 7 which receives an analysis result of the analyzer 6 to rearrange a program, a reverse-assembler 9 for generating a disassemble code to designating the position or the like of a branch instruction for the relocator 7, and a converter 8 which receives the binary program rearranged by the relocator 7 to update the program from an instruction code of a computer before conversion into an instruction code of a computer after conversion or to update the address of a branch instruction to match the address.

An unconverted binary program1 is executed, and the operation history which is called trace information of the binary program is extracted by the tracer 2. This operation is called an execution trace or an execution profile. The execution trace results are collected in units of executable binary programs and in units of instruction blocks. The collected results are the trace information 3. The trace information 3 is analyzed by the analyzer 6. The analyzer 6 divides a binary program in units of control transfer instructions on the basis of the trace information 3 to form instruction blocks. The control transfer instruction is a branch instruction for controlling an execution order (execution address) of programs, a jump instruction, a call instruction, or the like. Therefore, the instruction block indicates a part of a binary program which is divided in units of control transfer instructions. However, an instruction block in which the start of the instruction block is divided by a label serving as a branch destination of a branch instruction is also known. The analyzer 6 checks, on the basis of the trace information 3, the number of times of execution of a specific instruction block or a branch performed from a specific block to a specific block.

The relocator 7 rearranges a program on the basis of a analysis result 11 of the analyzer 6. The rearrangement of the program means that the program is rearranged in units of the instruction blocks. The position of the control transfer instruction is represented by the reverse-assembler 9 as operand information 10 together with the position of the control transfer instruction.

A branch destination instruction block of a branch instruction having a low branch frequency in rearrangement is arranged in an upper address direction of a main storage device. On the other hand, a branch destination instruction block of a branch instruction having a high branch frequency is arranged in a lower direction of the address of the main storage device.

With respect to the branch instruction having a high branch frequency, in place of arrangement of an instruction block of the branch destination in the lower direction of the address, a decision condition of a branch may be inverted to directly connect the branch destination instruction block to a branch source instruction block. In this case, the branch destination instruction block obtained by the inverted branch condition is arranged in the upper address direction.

As a result, a branch destination instruction block having a low branch frequency is arranged in the upper address direction. A branch destination instruction block having a high branch frequency is arranged in the lower direction of the address or arranged to be directly connected to the branch source instruction block.

Finally, conversion to an instruction code of the computer used after conversion and a change in a branch destination address of a branch instruction are performed by the converter 8. A converted binary program is output. The change in the branch destination address of the branch instruction may be performed simultaneously with rearrangement of instruction blocks in the relocator 7.

FIG. 5 shows an example of an converted binary program. A program portion in FIG. 5 expresses a first instruction block 20 started from an address where label ENT1 exists and ended by JNE instruction, a second instruction block 21 started from the next instruction (PUSH instruction) of JNE instruction and ended by an instruction (ADD instruction) immediately before label L1, and a third instruction block 22 constituted by only RET instruction having label L1. In this case, JNE instruction is an instruction which performs a branch if Jump on Not Equal, i.e., if eax and ebx obtained by Test instruction immediately before the instruction are not equal to each other. RET instruction is Return instruction, i.e., an instruction which moves an execution address to the next address of CALL instruction executed before RET instruction.

The first instruction block 20 is assumed as an instruction block which executes a main function, and the second instruction block 21 is assumed as an error process block. Such an error process has an execution frequency lower than the frequency of execution of a normal function.

As described above, the processor of this embodiment predicts that a branch is performed to a branch instruction in a lower direction of an address and predicts that a branch is not performed in an upper direction in a static branch prediction.

When the processor executes a program having the structure of the instruction blocks as shown in FIG. 5, the instruction of the second instruction block 21 is filled in a pipeline in the instruction block subsequent to the first instruction block 20.

However, the second instruction block 21 is an error process, and is rarely executed. For this reason, in general, a branch is generated by the final JNE instruction of the first instruction block 20, instructions of the blocks subsequent to the third instruction block 22 indicated by label L1 are executed.

As a result, all the instructions of the second instruction block 21 filled in the pipeline are abandoned, the pipeline is assembled again by instructions subsequent to RET instruction of the third instruction block 22.

For this reason, in the binary program conversion tool of this embodiment, as shown in FIG. 6, the instruction blocks of a program are rearranged. In FIG. 6, the third instruction block 22 is arranged immediately after the first instruction block 20, and the second instruction block 21 for executing an error process is arranged after the third instruction block 22 (upper address direction).

The branch condition of the final conditional branch instruction of the first instruction block 20 is inverted to be JE instruction, and the branch destination is represented by label new_L1. In this case, JE instruction is an instruction which performs a branch if Jump on Equal is set, i.e., eax and ebx obtained by Test instruction executed immediately before JE instruction are equal to each other.

When a program having the structure of the instruction block is executed by the processor of this embodiment, after the first instruction block 20 is executed, it is predicted that the final conditional branch instruction JE does not perform a branch, and an instruction executed after RET instruction of the third instruction block 22 executed immediately after the first instruction block 20 is filled in the pipeline. In actual execution, the instructions are executed as described above. In this manner, since the instructions are executed without disturbing the pipeline, the performance of the processor having the pipeline process function can be sufficiently achieved.

Although the lengths of all the instructions are assumed as 4 bytes in FIGS. 5 and 6, the present invention is not limited to the computer having the instruction code described above.

Figure 7:
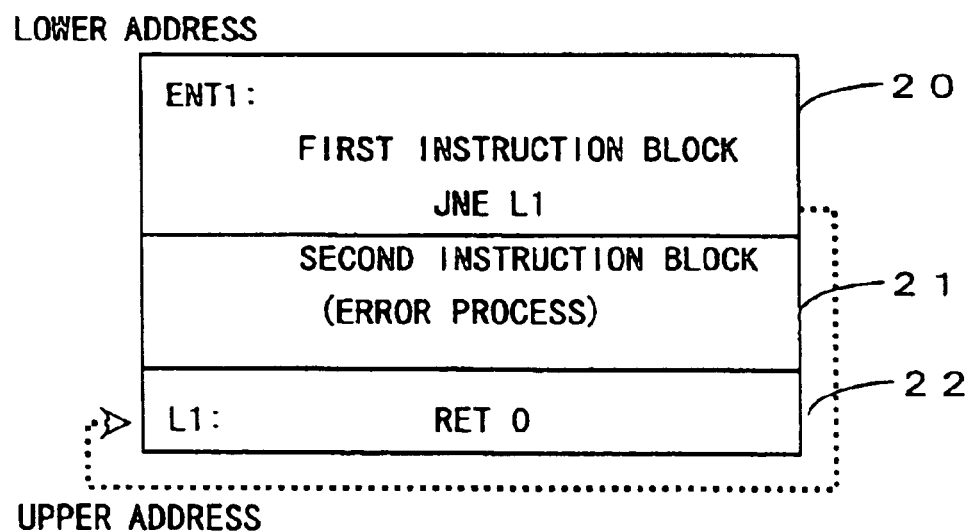
FIG. 7 is a diagram showing an instruction block configuration of unconverted program 1.
Figure 8:
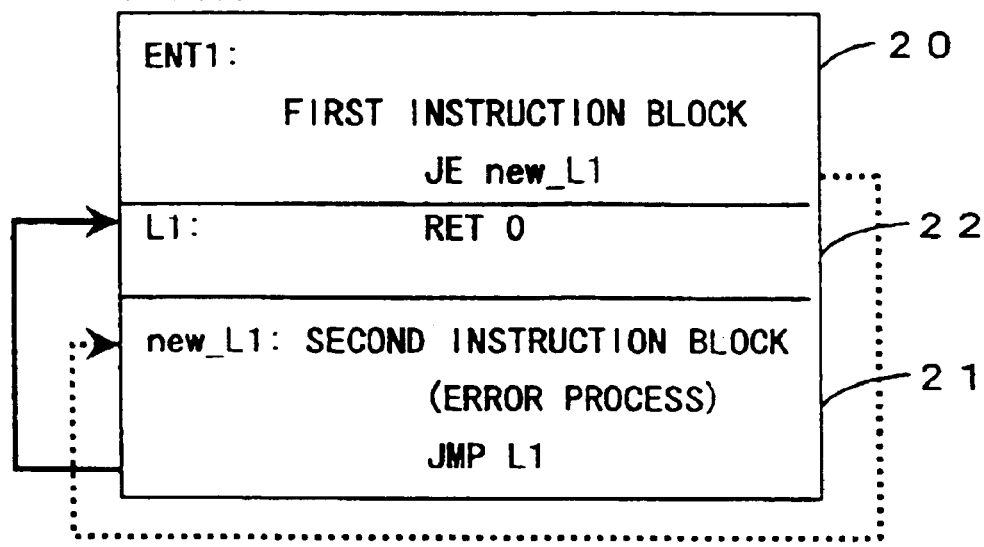
FIG. 8 is a diagram showing an instruction block configuration of converted program 1.

FIGS. 7 and 8 typically express the arrangement and branch states of the instruction blocks in FIGS. 5 and 6. In FIGS. 7 and 8, branches expressed by arrows. A solid arrow indicates a branch having a high branch probability or an unconditional branch, and a dotted arrow indicates a branch having a low branch probability. Although not shown in FIGS. 7 and 8, the upper direction is defined as an upper address direction.

Figure 9:
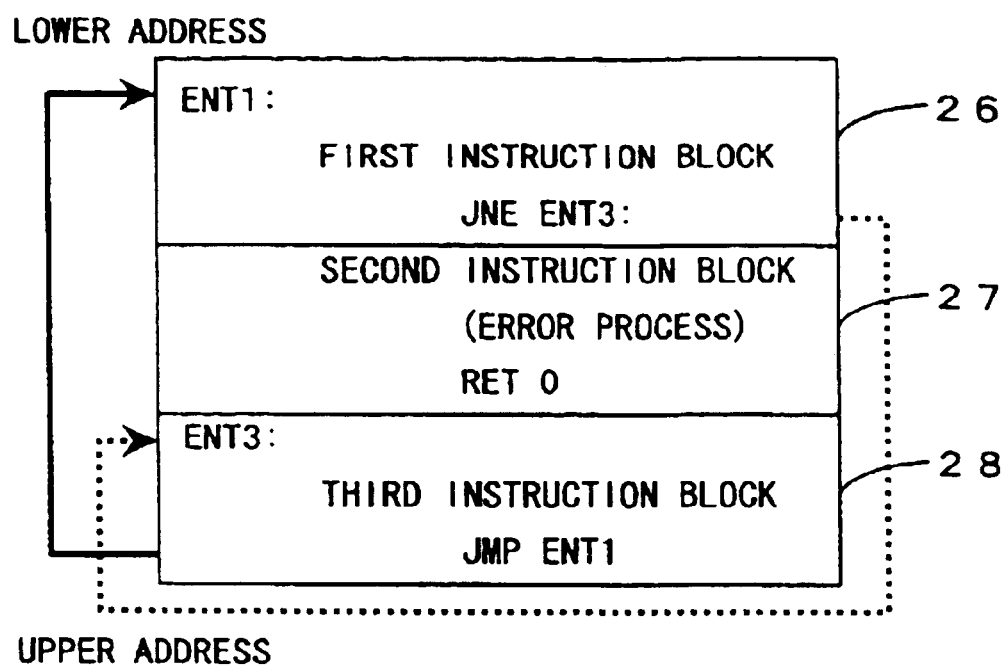
FIG. 9 is a diagram showing an instruction block configuration of unconverted program 2.
Figure 10:
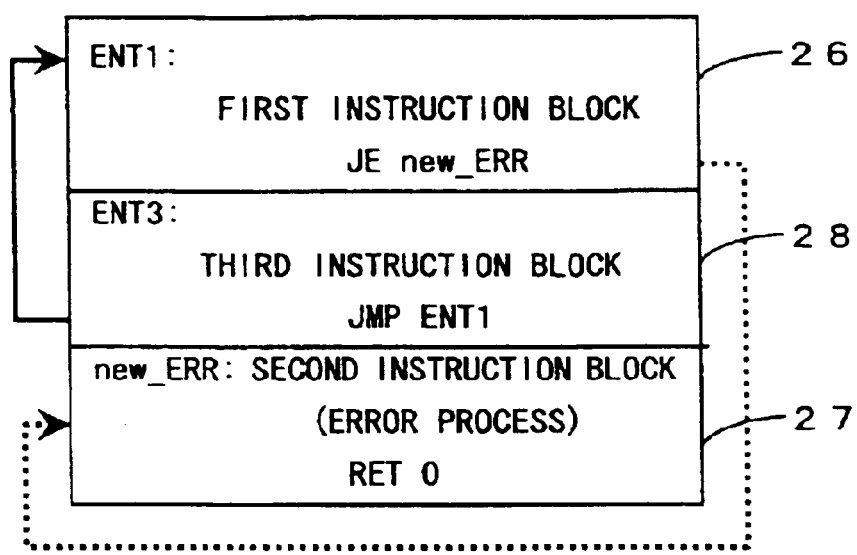
FIG. 10 is a diagram showing an instruction block configuration of converted program 2 (1).
Figure 11:
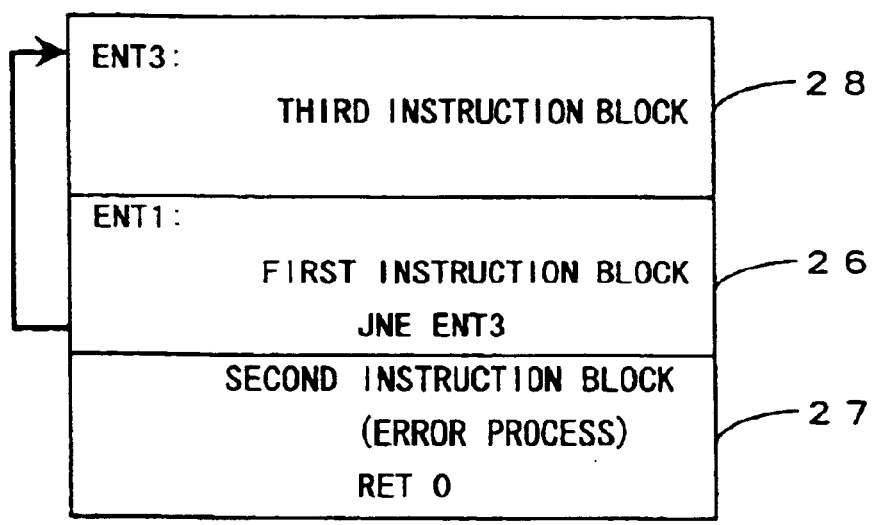
FIG. 11 is a diagram showing an instruction block configuration of converted program 2 (2).

FIGS. 9 to 11 typically express the arrangement and branch states of the instruction blocks in a second program example (program example 2). The upper address direction and the means of the arrows are the same as those in FIGS. 7 and 8.

FIG. 9 is an unconverted program according to this embodiment. Like program example 1, the program is constituted by first to third instruction blocks. The program in FIG. 9 is different from program example 1 in the following points. That is, RET instruction is executed at the end of an error process block 27 serving as the second instruction block, and return from a third instruction block 28 to a first instruction block 26 is performed by JMP instruction (unconditional branch). For this reason, this program repeats the first and third instruction blocks until an error is generated.

In this embodiment, it is assumed that the execution frequency of the error process of the second instruction block 27 is lower than those of the first instruction block 26 and the third instruction block 28 which are normal processes. In this structure, once the program is executed to operate a dynamic branch prediction, the pipeline is rarely disturbed even though the pipeline includes a conditional branch instruction.

However, when these instructions are executed for the first time, or when a memory for storing a branch history overflows, a dynamic branch prediction does not operate.

For this reason, when the state in FIG. 9 is not changed, processing efficiency is still poor in the processor according to this embodiment.

In FIG. 10, a result obtained such that program example 2 in FIG. 9 is converted by the binary program conversion tool of this embodiment is shown. In FIG. 10, as in FIG. 8, the error process block 27 is moved in the upper address direction, and branch destination label new_ERR: is added to the error process block 27. The decision condition of the final branch instruction (JNE instruction) of the first instruction block 26 is inverted to be JE instruction, and jump to the error process block is performed. However, an unconditional branch instruction from the third instruction block 28 to the first instruction block 26 is not changed.

When the program is executed by a processor such as the Pentium Pro, as in the case shown in FIG. 8, it is predicted that the conditional branch instruction (JE) of the first instruction block 26 does not perform a branch, and the first and third instruction blocks 26 and 28 are sequentially filled in the pipeline. Since an error rarely generated in actual execution, the pipeline is rarely disturbed.

Program example 2 shown in FIG. 9 is also preferably rearranged as shown in FIG. 11. In this example, the third instruction block 28 is placed first, and the first instruction block 26 is placed immediately after the third instruction block 28, so that an unconditional branch instruction from the third instruction block 28 to the first instruction block 26 is unnecessary. The branch destination address of conditional branch instruction JNE is changed such that a branch is performed in the lower direction (descending direction) from the first instruction block 26 to the third instruction block 28. More specifically, the address of label ENT3 is changed. Therefore, when the program is executed by the processor according to the embodiment, a branch from the first instruction block 26 to the third instruction block 28 is predicted, and the instructions of the first and third instruction blocks 26 and 28 are sequentially filled in the pipeline. When the branch is also performed in execution of an actual process, the pipeline is rarely disturbed.

A conversion result of a binary program for efficiently executing a pipeline process to a processor for implicitly predicting that a branch is not performed in the upper address direction in a conditional branch instruction and that a branch is performed in the lower direction of the address in the conditional branch instruction in the static branch prediction has been described above. On the other hand, as for a processor for implicitly predicting that a branch is not performed in the lower direction of address in a conditional branch instruction and that a branch is performed in the upper address direction in the conditional branch instruction in the static branch prediction, the similar process shown above can be applied to it.

Figure 12:
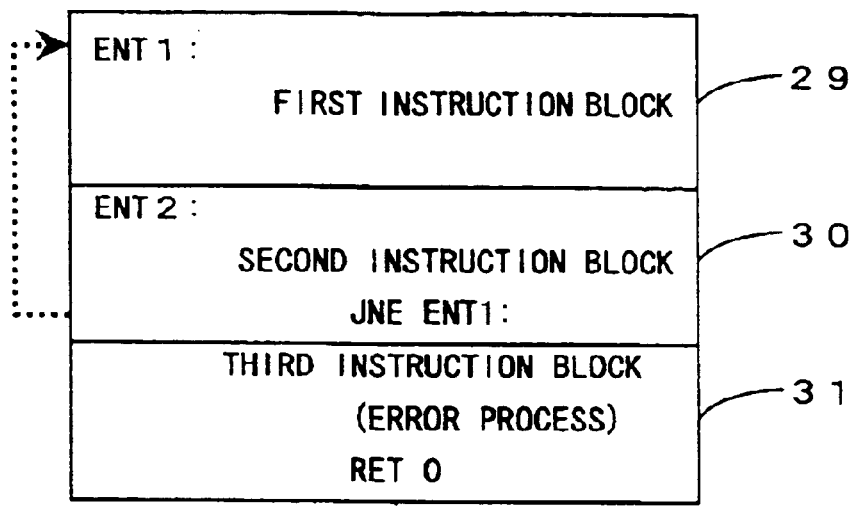
FIG. 12 is a diagram showing an instruction block configuration of unconverted program 3.

For example, FIG. 12 shows a configuration of an instruction block of an unconverted program. In this example, conditional branch instruction JNF is placed at the end of a second instruction block 30, and a third instruction block 31 for performing an error process is placed after the second instruction block 30. When the program is executed by a processor for predicting that a branch is not performed in the lower direction of the address as described above, it is predicted that the branch instruction of the second instruction block 30 does not perform a branch. For this reason, an instruction for executing an error process of the third instruction block 31 after the second instruction block 30 is filled in the pipeline.

Figure 13:
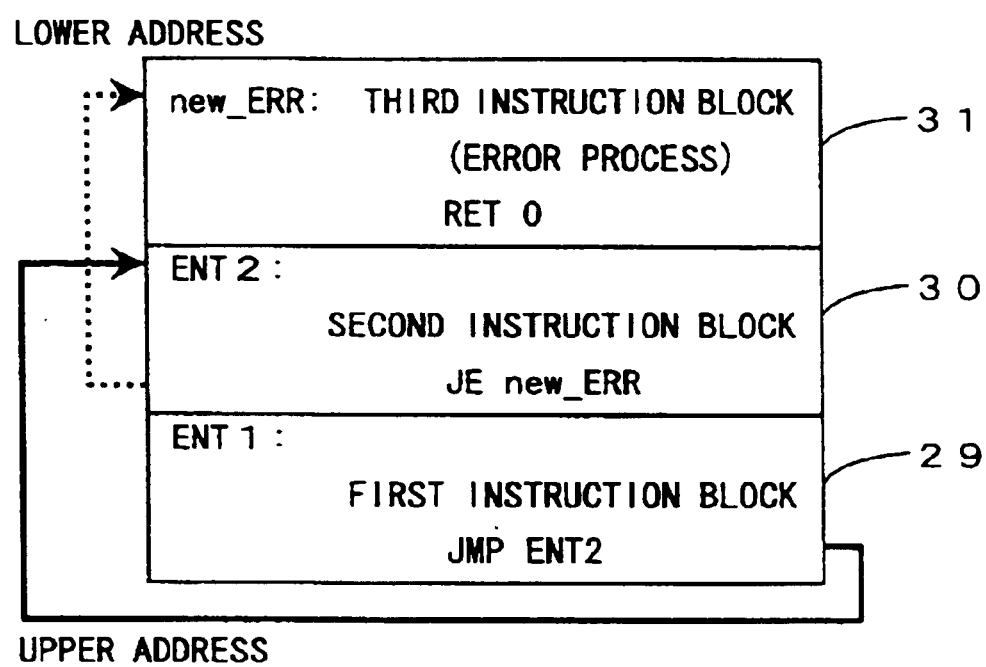
FIG. 13 is a diagram showing an instruction block configuration of converted program 3 (1).
Figure 14:
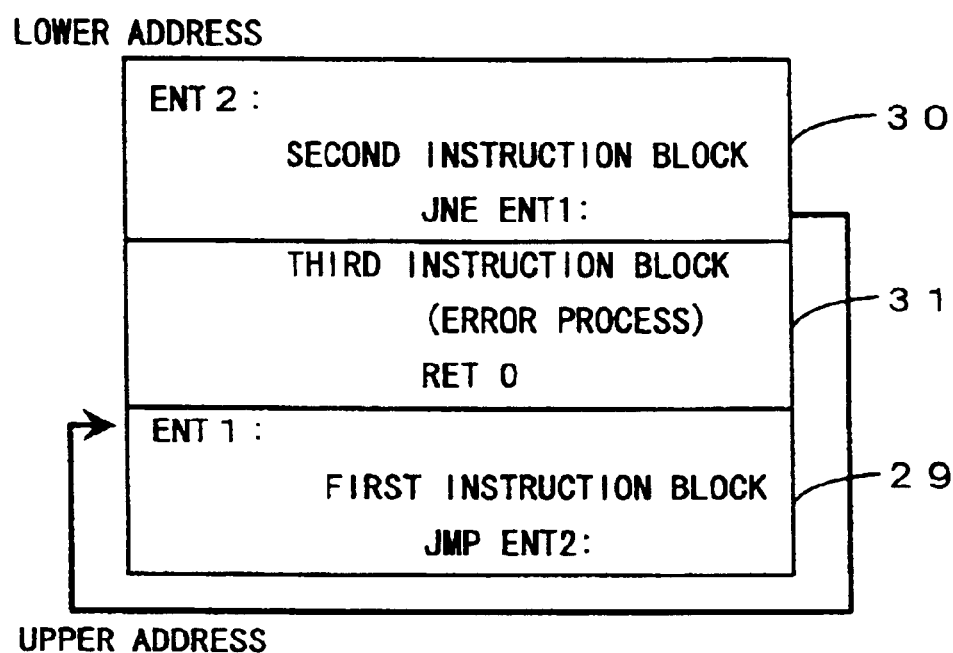
FIG. 14 is a diagram showing an instruction block configuration of converted program 3 (2).

On the other hand, if an error process is rarely executed in actual execution, as in the case shown in FIG. 9, the pipeline is disturbed. Therefore, conversion is performed as shown in FIG. 13 or 14, so that a branch prediction is matched to the occurrence of an actual branch. The pipeline can be reduced in disturbance.

In FIG. 13, since a branch destination of the conditional branch instruction of the second instruction block 30 is in the lower direction of the address, it is predicted that a branch is not performed, and the instructions of the first instruction block 29 and the second instruction block 30 are sequentially filled in the pipeline to be executed.

In FIG. 14, since a branch destination of the conditional branch instruction of the second instruction block 30 is in the upper address direction, it is predicted that a branch is not performed, and the instructions of the first instruction block 29 and the second instruction block 30 are sequentially filled in the pipeline to be executed. However, as shown in Japanese Patent Application Laid-Open No. 10-187460, from a viewpoint of effective usage of a memory cache, instruction blocks each having a high execution frequency are preferably arranged as linearly as possible. From the viewpoint, the arrangement of FIG. 13 is more preferable than FIG. 14.

The branch prediction characteristics of a processor or the conversion specification of a program may be given when conversion is executed, or incorporated as internal parameters of a binary program conversion tool. The conversion specification of the program is that, e.g., arranged instruction blocks has any one of the arrangement shown in FIGS. 10 and 11 and the arrangement shown in FIGS. 13 and 14 (whether instruction block to be executed are arranged as linearly as possible or not).

In this embodiment, only a computer for a normal pipeline process has been described above. However, the present invention can also be applied to a computer having a super pipeline process function in which the states of a pipeline are more finely divided.

What is claimed is:

1. A program conversion device for converting a first binary program constituted by a plurality of instruction blocks into a second binary program executed by a computer having branch prediction means, comprising:
   an execution information storage storing execution information collected when the first binary program is executed in advance;
   an analyzer analyzing execution characteristics of a branch instruction between the plurality of instruction blocks in the first branch program from the execution information;
   a branch prediction characteristics storage storing branch prediction characteristics of the computer; and
   a converter updating branch instructions between the plurality of instruction blocks in the first binary program on the basis of the execution characteristics of the branch instruction and the branch prediction characteristics such that a hit rate of the branch prediction is increased,
   wherein, when the computer has branch prediction characteristics for performing a rather low prediction of the execution probability of a branch with respect to a branch instruction to an address in an upper direction, the converter reconstitutes a plurality of instruction blocks such that a branch instruction having a low frequency in the occurrence of a branch becomes a branch instruction to an address in the upper direction and that a branch instruction having a high frequency in the occurrence of a branch becomes a branch instruction to an address in a lower direction.

2. The device of claim 1, wherein the converter reconstitutes, with respect to a branch instruction having a high frequency in the occurrence of a branch, a plurality of instruction blocks such that a portion corresponding to an instruction block before a branch and a portion corresponding to an instruction block after a branch continue.

3. A program conversion device for converting a first binary program constituted by a plurality of instruction blocks into a second binary program executed by a computer having branch prediction means, comprising:
   an execution information storage storing execution information collected when the first binary program is executed in advance;
   an analyzer analyzing execution characteristics of a branch instruction between the plurality of instruction blocks in the first branch program from the execution information;
   a branch prediction characteristics storage storing branch prediction characteristics of the computer; and
   a converter updating branch instructions between the plurality of instruction blocks in the first binary program on the basis of the execution characteristics of the branch instruction and the branch prediction characteristics such that a hit rate of the branch prediction is increased,
   wherein, when the computer has branch prediction characteristics for performing a rather low prediction of the execution probability of a branch with respect to a branch instruction to an address in a lower direction, the converter reconstitutes a plurality of instruction blocks such that a branch instruction having a low frequency in the occurrence of a branch becomes a branch instruction to an address in the lower direction and that a branch instruction having a high frequency in the occurrence of a branch becomes a branch instruction to an address in an upper direction.

4. The device of claim 3, wherein the converter reconstitutes, with respect to a branch instruction having a high frequency in the occurrence of a branch, a plurality of instruction blocks such that a portion corresponding to an instruction block before a branch and a portion corresponding to an instruction block after a branch continue.

5. A method of converting a first binary program constituted by a plurality of instruction blocks into a second binary program executed by a computer, comprising:
   storing execution information collected when the first binary program is executed in advance;
   analyzing execution characteristics of a branch instruction between the plurality of instruction blocks in the first branch program from the execution information;
   storing branch prediction characteristics of the computer; and
   updating branch instructions between the plurality of instruction blocks in the first binary program on the basis of the execution characteristics of the branch instruction and the branch prediction characteristics such that a hit rate of the branch prediction is increased,
   wherein, when the computer has branch prediction characteristics for performing a rather low prediction of the execution probability of a branch with respect to a branch instruction to an address in an upper direction, the updating reconstitutes a plurality of instruction blocks such that a branch instruction having a low frequency in the occurrence of a branch becomes a branch instruction to an address in the upper direction and that a branch instruction having a high frequency in the occurrence of a branch becomes a branch instruction to an address in a lower direction.

6. The method of claim 5, wherein the updating reconstitutes, with respect to a branch instruction having a high frequency in the occurrence of a branch, a plurality of instruction blocks such that a portion corresponding to an instruction block before a branch and a portion corresponding to an instruction block after a branch continue.

7. A method of converting a first binary program constituted by a plurality of instruction blocks into a second binary program executable by a computer, comprising:

storing execution information collected when the first binary program is executed in advance;

analyzing execution characteristics of a branch instruction between the plurality of instruction blocks in the first branch program from the execution information;

storing branch prediction characteristics of the computer; and updating branch instructions between the plurality of instruction blocks in the first binary program on the basis of the execution characteristics of the branch instruction and the branch prediction characteristics such that a hit rate of the branch prediction is increased, wherein, when the computer has branch prediction characteristics for performing a rather low prediction of the execution probability of a branch with respect to a branch instruction to an address in a lower direction, the converter reconstitutes a plurality of instruction blocks such that a branch instruction having a low frequency in the occurrence of a branch becomes a branch instruction to an address in the lower direction and that a branch instruction having a high frequency in the occurrence of a branch becomes a branch instruction to an address in an upper direction.

8. The method of claim 7, wherein the updating reconstitutes, with respect to a branch instruction having a high frequency in the occurrence of a branch, a plurality of instruction blocks such that a portion corresponding to an instruction block before a branch and a portion corresponding to an instruction block after a branch continue.

9. A storage medium readable by a machine storing instructions for causing the machine to perform a method of converting a first binary program constituted by a plurality of instruction blocks into a second binary program executed by a computer, the method comprising:

storing execution information collected when the first binary program is executed in advance;

analyzing execution characteristics of a branch instruction between the plurality of instruction blocks in the first branch program from the execution information;

storing branch prediction characteristics of the computer; and updating branch instructions between the plurality of instruction blocks in the first binary program on the basis of the execution characteristics of the branch instruction and the branch prediction characteristics such that a hit rate of the branch prediction is increased, wherein, when the computer has branch prediction characteristics for performing a rather low prediction of the execution probability of a branch with respect to a branch instruction to an address in an upper direction, the updating reconstitutes a plurality of instruction blocks such that a branch instruction having a low frequency in the occurrence of a branch becomes a branch instruction to an address in the upper direction and that a branch instruction having a high frequency in the occurrence of a branch becomes a branch instruction to an address in a lower direction.

10. The storage medium of claim 9, wherein the updating reconstitutes, with respect to a branch instruction having a high frequency in the occurrence of a branch, a plurality of instruction blocks such that a portion corresponding to an instruction block before a branch and a portion corresponding to an instruction block after a branch continue.

11. A storage medium readable by a machine storing instructions for causing the machine to perform a method of converting a first binary program constituted by a plurality of instruction blocks into a second binary program executable by a computer, the method comprising:

storing execution information collected when the first binary program is executed in advance;

analyzing execution characteristics of a branch instruction between the plurality of instruction blocks in the first branch program from the execution information;

storing branch prediction characteristics of the computer; and updating branch instructions between the plurality of instruction blocks in the first binary program on the basis of the execution characteristics of the branch instruction and the branch prediction characteristics such that a hit rate of the branch prediction is increased, wherein, when the computer has branch prediction characteristics for performing a rather low prediction of the execution probability of a branch with respect to a branch instruction to an address in a lower direction, the converter reconstitutes a plurality of instruction blocks such that a branch instruction having a low frequency in the occurrence of a branch becomes a branch instruction to an address in the lower direction and that a branch instruction having a high frequency in the occurrence of a branch becomes a branch instruction to an address in an upper direction.

12. The storage medium of claim 7, wherein the updating reconstitutes, with respect to a branch instruction having a high frequency in the occurrence of a branch, a plurality of instruction blocks such that a portion corresponding to an instruction block before a branch and a portion corresponding to an instruction block after a branch continue.

* * * * *

UNITED STATES PATENT AND TRADEMARK OFFICE
CERTIFICATE OF CORRECTION

PATENT NO.    : 6,813,763 B1
DATED         : November 2, 2004
INVENTOR(S)   : Satoshi Takahashi et al.

It is certified that error appears in the above-identified patent and that said Letters Patent is hereby corrected as shown below:

Title page,
Item [54], Title, change "THEREFOR" to -- THEREOF --.
Item [56], References Cited, FOREIGN PATENT DOCUMENTS, change "EP 0 836 755 A2" to -- 0838755 A2 --.
*Primary Examiner*, change "Obamel C. Das" to -- Chameli Das --.
Item [57], ABSTRACT,
Line 18, change "bit" to -- hit --.

Signed and Sealed this

Twenty-fourth Day of May, 2005

JON W. DUDAS
*Director of the United States Patent and Trademark Office*